(12) United States Patent
Batista et al.

(10) Patent No.: US 6,925,953 B1
(45) Date of Patent: Aug. 9, 2005

(54) LEVITATION AND STABILIZING HULL SYSTEM

(76) Inventors: Carmelo Batista, 4542 W. 15 Ave., Hialeah, FL (US) 33012; Salomon Alalu, 2210 NE. 203 Ter., Aventura, FL (US) 33180

( * ) Notice: Subject to any disclaimer, the term of this patent is extended or adjusted under 35 U.S.C. 154(b) by 75 days.

(21) Appl. No.: 10/762,606

(22) Filed: Jan. 23, 2004

(51) Int. Cl.[7] .............................................. B63B 1/32
(52) U.S. Cl. ...................................... 114/288; 114/291
(58) Field of Search ...................... 114/274, 288, 289, 114/290, 291, 67 A, 67 R

(56) References Cited

U.S. PATENT DOCUMENTS

| | | | |
|---|---|---|---|
| 4,393,802 A * | 7/1983 | Rizzo | 114/67 A |
| 5,452,676 A | 9/1995 | Fiore | 114/291 |
| 5,476,061 A | 12/1995 | Ackerbloom | 114/290 |
| 5,983,823 A | 11/1999 | Allison | 114/271 |
| 6,363,877 B1 * | 4/2002 | Craddock | 114/271 |
| 6,425,341 B1 * | 7/2002 | Devin | 114/288 |

* cited by examiner

Primary Examiner—Stephen Avila
(74) Attorney, Agent, or Firm—J. Sanchelima; A. Bordas

(57) ABSTRACT

A hull system for boats that includes pairs of longitudinally extending strakes with a cross-section that includes a downwardly extending fin member with an adjacent flat horizontal section to provide running and idle stability. Steps with a projected V-shape pint forward and include air inlets with the distal ends. Channels run adjacent to the drop off wall of the steps to trap air forming an air cushion that tends to lift the moving hull. The resulting hull system provides optimal performance while running and still maintains good stability from oscillation when idle. A peripheral chin has a substantially triangular cross-section that extends vertically downwardly inside the body of water over which the boat floats.

6 Claims, 5 Drawing Sheets

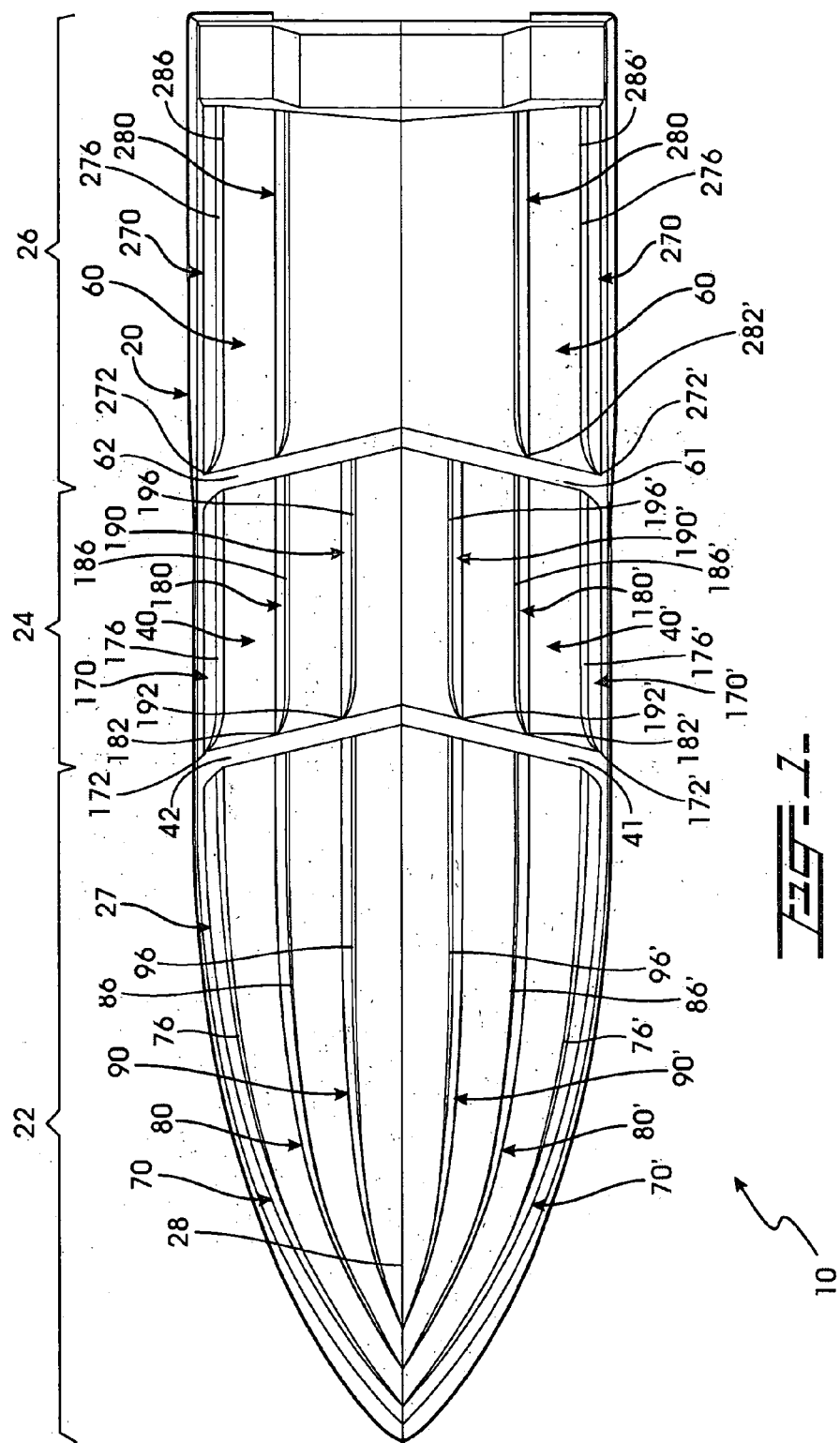

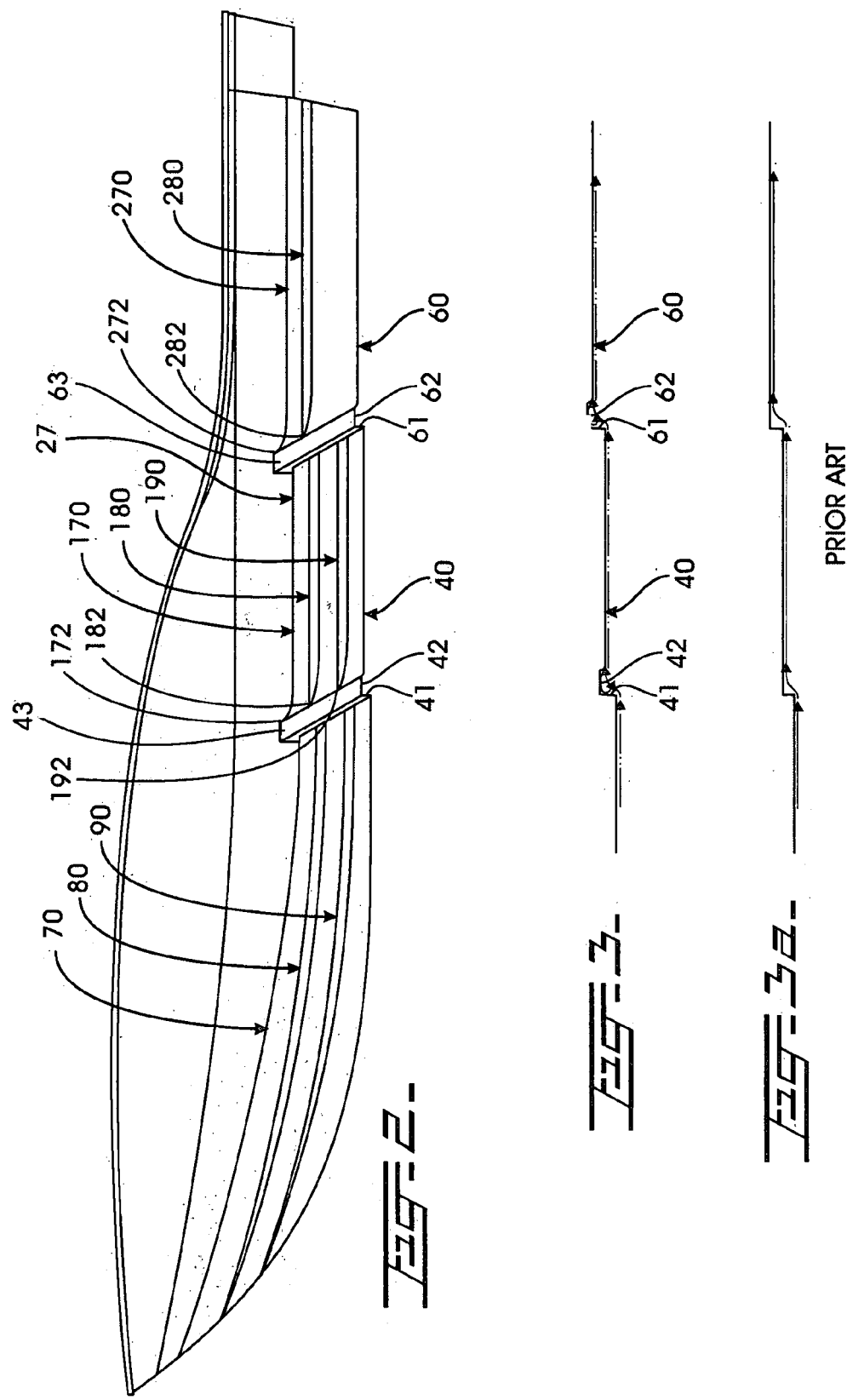

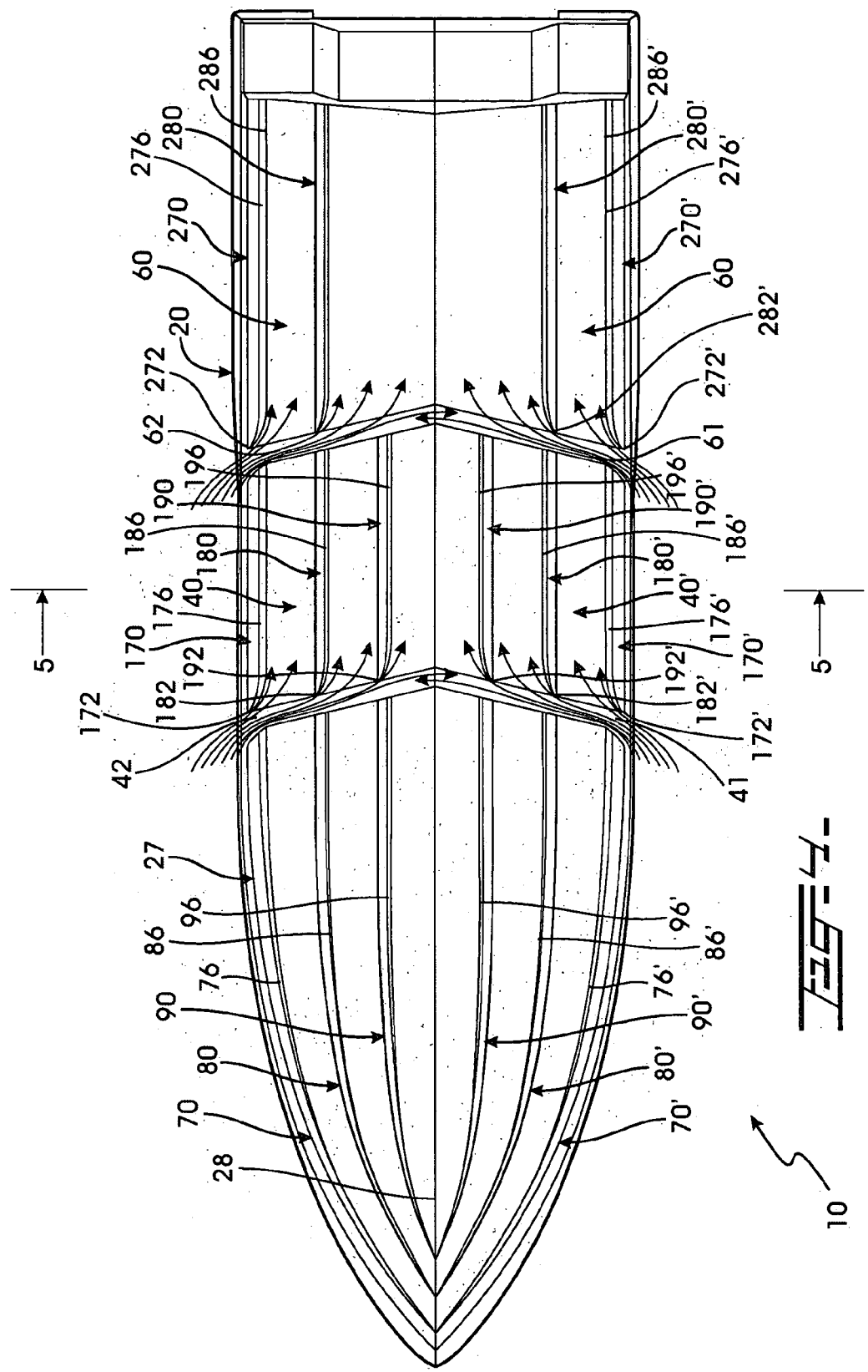

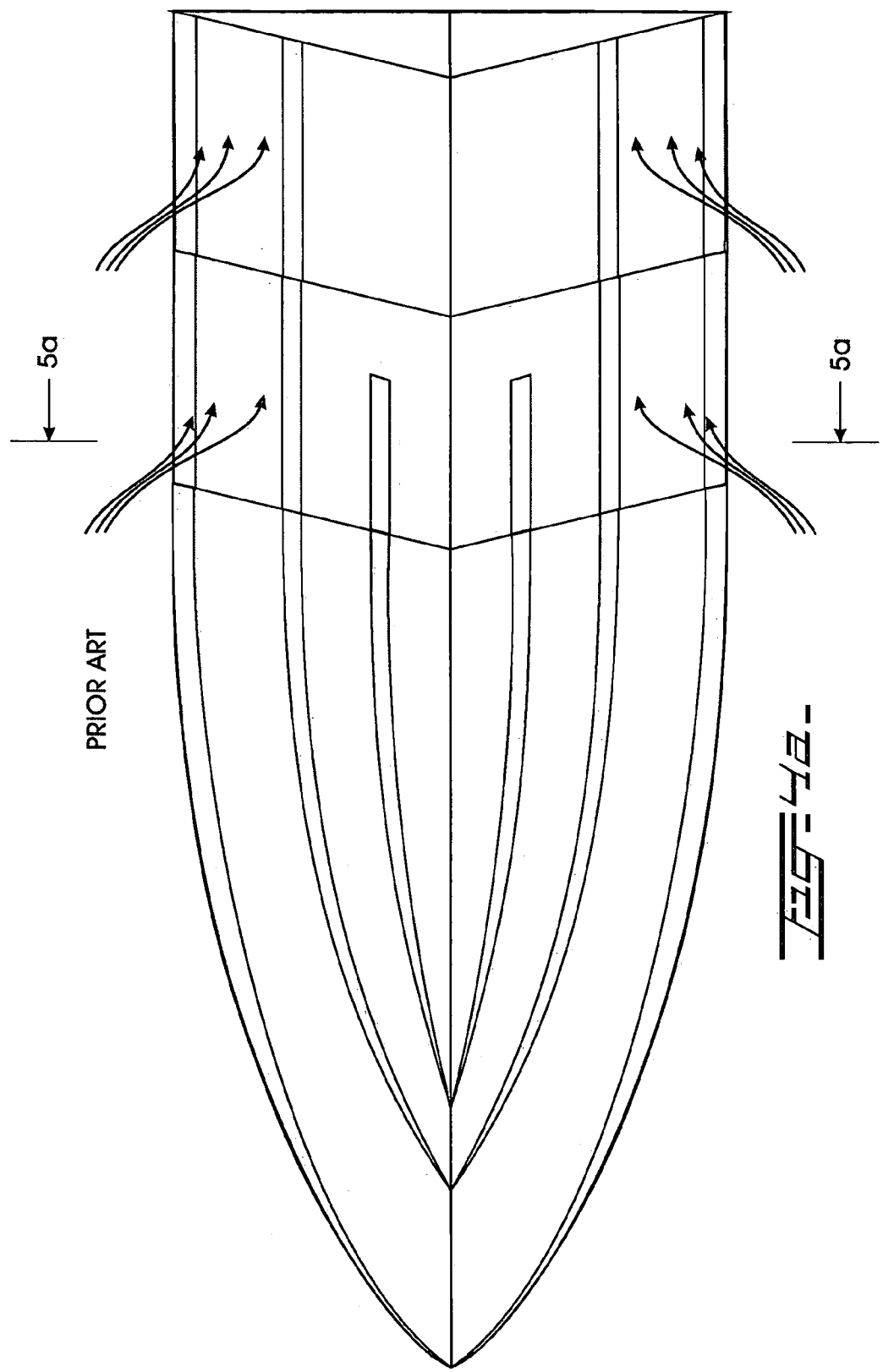

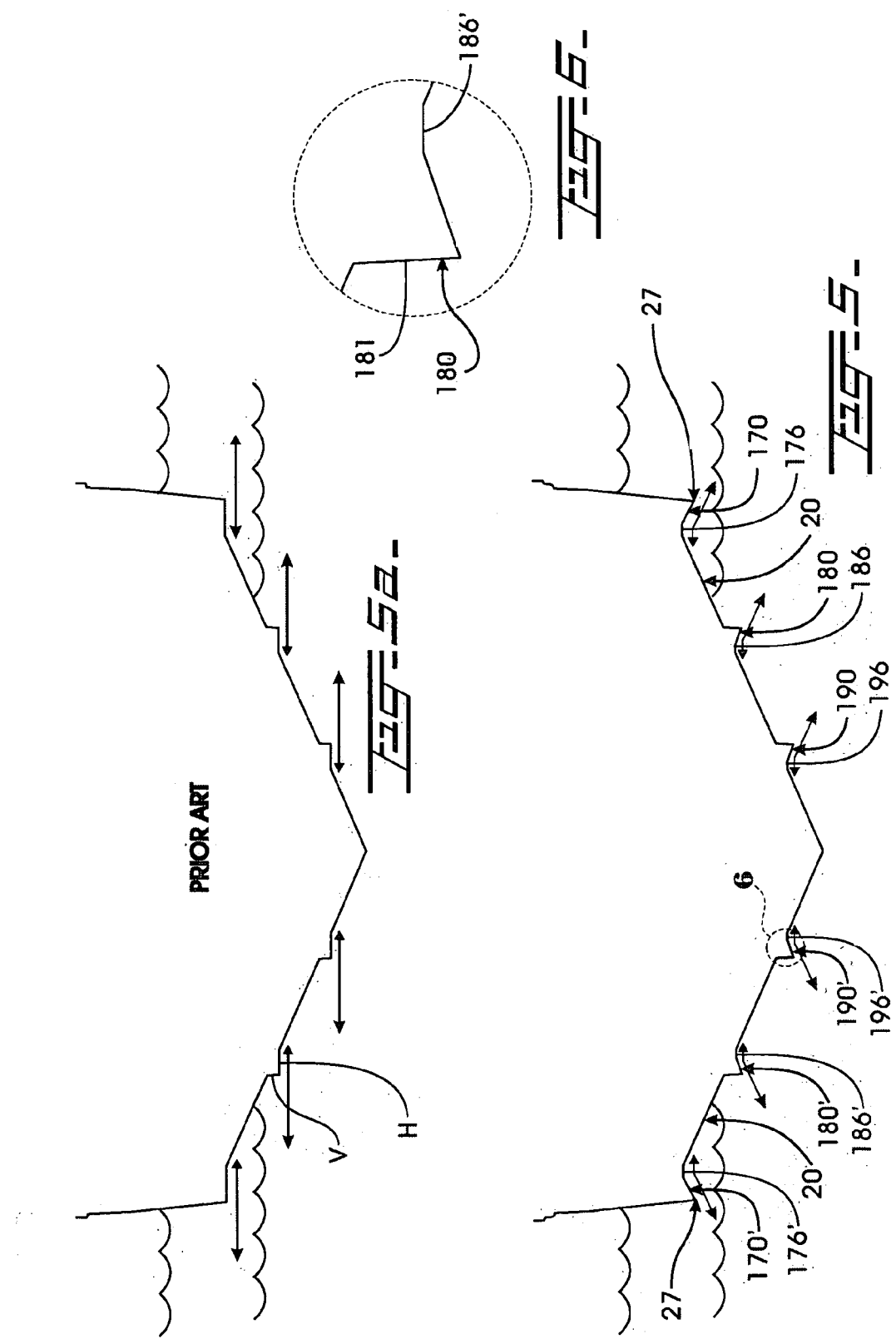

LEVITATION AND STABILIZING HULL SYSTEM

II. BACKGROUND OF THE INVENTION

1. Field of the Invention

The present invention relates to a stabilizing hull system for boats that improves displacement performance without compromising its at idle stability.

2. Description of the Related Art

Many designs for boat hulls have been developed in the past. None of them, however, includes such combination of steps, channels and strakes on the underside of the hull that permit the boat levitate achieving remarkable running stabilization. In the present invention, the longitudinal angles of the strakes are in a disposition with respect to the steps to provide optimal circulation of the air between the bottom and the body of water. The boat's strakes also provide substantial idle stability with the flat horizontal portions adjacent to the plowing fin members.

Applicant believes that the closest reference corresponds to U.S. Pat. No. 5,452,676 issued to Fiore on Sep. 26, 1995 for a hull configuration for high-speed boats. Fiore's patented invention includes a V-shaped hull with multiple steps in the fore-and-aft direction in combination with a variable dead rise from keel to chine in the steps providing an increased support of the hull near the chines, and relatively less support near the keel. One of the objects of the Fiore's patented invention is to minimize the running friction between the hull and the water surface and to stabilize the hull at high running speeds. In the Fiore's patent the beam of the hull chine increases from bow to transom providing lateral stability. The combination of multiple steps and variable dead rise provides longitudinal stability. The present invention also provides a hull chine that extends from bow to transom providing lateral stability. However, Fiore's patented invention differs from the present invention because the latter includes a channel adjacent to the steps allowing air to come in forming a cushion that tends to raise the hull, which allows the boat to run with optimum performance.

Applicant believes that another relevant reference corresponds to U.S. Pat. No. 5,983,823 issued to Allison on Nov. 16, 1999 for a high-speed sport/utility boat. Allison's patented invention includes a V-bottom hull for sport/utility boats with intermediate lifting strakes along the aft half of the hull bottom positioned laterally along the boat bottom between the planing pad step and the chine. Allison's invention intends to reduce the turning circle executed at high speed. However, Allison's patented invention differs from the present invention because the latter includes at least one pair of strakes with a fin at an angle with respect to the hull V-shape bottom surface and a horizontal longitudinal section next to each strake. Such combination provides an optimal stability whether the boat is anchored or high-speed running and also makes the displacement line of the boat straight.

Applicant believes that U.S. Pat. No. 5,476,061 issued to Ackerbloom on Oct. 4, 1994 for a power boat hull may be related. Ackerbloom's patented invention refers to a powerboat hull having an outer running surface that forms a channel with a concave curvature. The Ackerbloom's hull design is intended to create a large surface area that comes in contact with the water when the boat is turned. As disclosed in Ackerbloom's patent, a problem with large surface areas is that water may hook the bow resulting in a dip or a spin when a boat with a lifting structure at its stern is turned in choppy water. The deep concave channel captures displaced water and directs it to the rear of the boat where the after portion of the channel turns down the water to lift the rear of the boat during takeoff and at moderate boat running speeds. At high speeds, the channel is lifted out of the water so that water passes along the boat. Only when the boat is turned, the channel again becomes effective. However, Ackerbloom's invention differs from the present invention because this invention includes the disposition of strakes with fin members at an angle with respect to the hull V-shape bottom surface and a horizontal longitudinal section next to each strake gives stability to the boat even when the boat is running at high speeds.

None of hulls in the prior art, however, includes a system that provides a stabilized and balanced hull. This reduces the power that is required to propel the boat through the water. In fact, the prior fails to disclose a boat capable of keeping a straight displacement line on the water such as with the present invention. The invention channel in the present application has a channel adjacent to and in a parallel relationship with respect to the transversal steps that allows elevated drive heights keeping the boat stabilized and with more trim leverage. This in turn allows the user to run the boat at any given speed with optimum performance. Also, the present invention provides for at least one pair of strakes with fin members at an angle with respect to the hull V-shaped bottom surface and a horizontal longitudinal section next to each strake. Such combination provides optimal stability and makes the displacement line of the boat straight. Such combination also provides these advantages whether the boat is anchored or running at high speed.

Other patents describing the closest subject matter provide for a number of more or less complicated features that fail to solve the problem in an efficient and economical way. None of these patents suggest the novel features of the present invention.

III. SUMMARY OF THE INVENTION

It is one of the main objects of the present invention to provide a hull for a boat with a combination of steps, channels and strakes on its underside resulting in a boat with optimal stabilization characteristics and better performance.

It is another object of this invention to provide a hull for a boat that achieves optimal trim leverage and stabilized handling of the boat.

It is still another object of the present invention to provide minimum transversal oscillation movements and minimum lateral displacement of the boat while cruising.

It is yet another object of this invention to provide such a hull that is inexpensive to manufacture and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents bottom view of the hull system, object of the present application.

FIG. 2 is a side elevational view of the boat, showing the steps on the underside of the hull.

FIG. 3 shows a schematic view of the steps on the underside of the hull for the present invention.

FIG. 3a shows a schematic view of the steps on the underside of the hull for the prior art.

FIG. 4 is a bottom view of the hull for the present invention, showing the intake air flowing through the channels.

FIG. 4a is a partial bottom view of the hull for the prior art, showing the direction of the air flowing through the steps.

FIG. 5 illustrates a cross-section view take from FIG. 4 along lines 5—5, showing the disposition of the strakes in the present invention.

FIG. 5a illustrates a cross-section view take form FIG. 4a along lines 5a—5a, showing the disposition of the strakes in the prior art.

FIG. 6 is an enlarged view of one of the strikes taken form FIG. 5, line 6.

V. DETAILED DESCRIPTION OF THE PREFERRED EMBODIMENT

Referring now to the drawings, where the present invention is generally referred to with numeral 10 it can be observed that it basically includes hull underside 20, steps 40 and 60 and strakes 70; 80; 90; 170; 180; 190; 270; 280; 70'; 80'; 90'; 170'; 180'; 190'; 270' and 280', as seen in FIG. 1. The-cross-sections of the strakes are shown in FIG. 5B with those of the prior art represented in FIG. 5A.

Hull underside 20 has a substantially V-shape cross-section and includes fore section 22, amidships section 24 and aft section 26. Chine 27 extends peripherally as the intersection of the bottom and the side of the hull. The cross-section of chine 27 extends substantially vertically and downwardly to plow into the body of water thereby providing stability from lateral movements of the boat. Keel 28, as best seen in FIG. 1, runs longitudinal from the fore end to the aft end. Sections 22; 24 and 26 are defined by steps 40 and 60.

Channels 42 and 62, respectively, running adjacent and in a parallel relationship with respect to transversal corners 41 and 61 of steps 40 and 60, as seen in FIGS. 1 and 2. In the preferred embodiment channels 42 and 62 have a relatively small width with respect to the length of steps 40 and 60. Good results have been obtained with channels 42 and 62 having approximately 12 cm of width. The water flowing (or the boat sliding over the water) along fore section 22 of hull underside 20 goes to step 40 (and 60). An air current is created inside channel 42 (and 62) that tends to lift the boat resulting in better performance, as best seen in FIGS. 3 and 4. The air comes inside channels 42 and 62 through inlets 43 and 63. In the prior art the water goes from one step to the next step, as best seen in FIG. 3a, with a very limited amount of air going through. Steps 40 and 60 in the present invention have a V-shape pointing to the front of the hull, as seen in FIG. 1. This shape is intended to trap the air coming in from the sides of the boat and direct it towards keel 28 thereby forming an air cushion lifting the boat, as best seen in FIG. 4. Part of the air trapped in channel 42 (and 62) escapes to sections 24 and 26. The faster the boat runs the larger the pressure of the trapped air urging the boat to levitate.

Strakes 70; 80; 90; 70'; 80' and 90' extend longitudinally from fore to channel 42. Strakes 170; 180; 190; 170'; 180' and 190' extend longitudinally from channel 42 to channel 62. Strakes 270; 280; 270' and 280' extend longitudinally from channel 62 to aft. Strakes 70; 170; 270; 70'; 170' and 270' define chine 27. In section 22 strakes 70; 80; 90; 70'; 80' and 90' run longitudinally to the fore to converge in keel 28. Strakes 70; 80; 90; 170; 180; 190; 270; 280; 70'; 80'; 90'; 170'; 180'; 190'; 270' and 280' have a substantially triangular cross-section. Horizontal surfaces 76; 86; 96; 176; 186; 196; 276; 286; 76'; 86';. 96'; 176'; 186'; 196'; 276' and 286', respectively, extending longitudinally and are adjacent to strakes 70; 80; 90; 170; 180; 190; 270; 280; 70'; 80'; 90'; 170'; 180'; 190'; 270' and 280', as best seen in FIG. 5. Strakes 70; 80; 90; 170; 180; 190; 270; 280; 70'; 80'; 90'; 170'; 180'; 190'; 270' and 280' provide stability to the boat when idle and' also at low and high speed. When the water level is under chine 27 (planing) the strakes also provide stability. Horizontal surfaces 76; 86; 96; 176; 186; 196; 276; 286; 76'; 86'; 96'; 176'; 186'; 196'; 276' and 286' provide stability against bobbin to the boat at any speed.

The water flowing along the underside 20 is plowed by strakes 70; 80; 90; 170; 180; 190; 270; 280; 70'; 80'; 90'; 170'; 180'; 190'; 270' and 280', which point downwardly acting substantially like a fin. This results in a straight line running.

In the prior art shown in FIG. 5a, the strakes provide certain bobbin stability while the boat is anchored. However, the strakes have a substantially horizontal surface H that is larger than the vertical surface V. The latter accounts for the limited stability achieved against side movement. But if is not very effective, in particular when planning since it loses the vertical surface of the side S of the boat. In the present invention, the downwardly extending sides 71; 81; 91; 171; 181; 191; 271; 281; 71'; 81'; 91'; 171'; 181'; 191'; 271' and 281' are relatively larger than the horizontal surfaces 76; 86; 96; 176; 186; 196; 276; 286; 76'; 86'; 96'; 176'; 186'; 196'; 276' and 286'.

Also, in the present invention front ends 72; 82; 92; 172; 182; 192; 272; 282; 72'; 82'; 92'; 172'; 182'; 192'; 272' and 282' of strakes 70; 80; 90; 170; 180; 190; 270; 280; 70'; 80'; 90'; 170'; 180'; 190'; 270' and 280' are not squares to facilitate the intake of air trapped in channels 42 and 62 to portions 24 and 26, respectively, and also routing the water between contiguous strakes.

The present invention provides for enhanced stability that prevents side movement while running and vertical stability with the horizontal surfaces.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A hull for a high speed boat having generally a V-shape, comprising at least one pair of strakes longitudinally running along the entire length of said hull from a common point at the aft end of said hull and said strakes of each pair separating from each other as they extend towards the fore portion of the hull, said strakes having a cross-section that includes a fin member with a distal end that extends downwardly from said hull, said fin member having a substantially triangular shape with an outer side that is longer than an inner side to permit said distal end to extend substantially vertically inside a body of water and said cross-section further includes a flat horizontal section adjacent to said inner side so that running and idle stability can be achieved.

2. The hull set forth in claim 1 wherein said hull includes at least one step with a drop off wall and having a projected V-shape pointing to the back of said boat and having two distal ends that allow air in as the boat moves thereby forming an air cushion tending to lift said hull.

3. The hull set forth in claim 2 wherein said at least one step includes step includes a longitudinal channel running adjacent to said drop off wall and having a predetermined width so that a portion of the air through said distal ends is trapped therein.

4. The hull set forth in claim 3 further including a peripheral chine having a substantially triangular cross-section that extends vertically and downwardly inside a body of water over which said boat floats.

5. A hull for a high speed boat having at least one step with a drop off wall and having a projected V-shape pointing to the back of said boat and having two forward extending distal ends that allow air in as the boat moves thereby forming an air cushion tending to lift said hull, said at least one step includes a longitudinal channel running adjacent to said drop off wall and having a predetermined width so that a portion of the air through said distal ends is trapped therein.

6. The hull set forth in claim 6 further including a peripheral chin having a cross-section with a substantially triangular shape that extends vertically and downwardly inside a body of water over which said boat floats.

* * * * *